W. R. ALLEN.
LAND MARKER.
APPLICATION FILED JULY 22, 1912.
1,065,097.
Patented June 17, 1913.
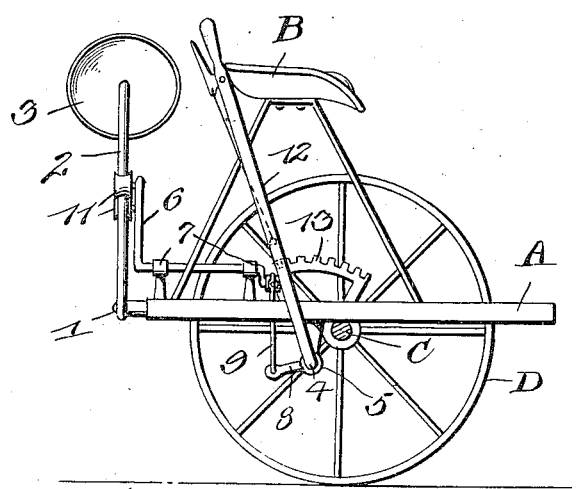
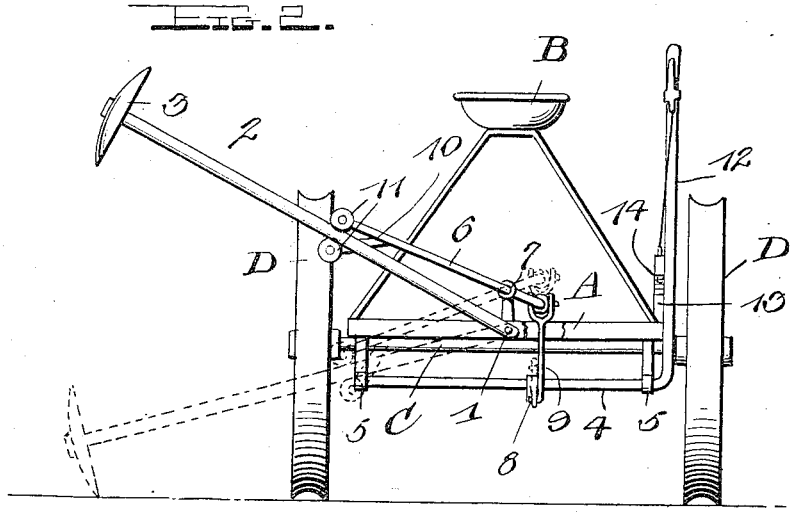
Witnesses
Chas. L. Griesbauer.
A. B. Norton.
Inventor
W. R. Allen,
By Watson E. Coleman.
Attorney

UNITED STATES PATENT OFFICE.

WILLIAM R. ALLEN, OF GOLDENGATE, ILLINOIS.

LAND-MARKER.

1,065,097. Specification of Letters Patent. Patented June 17, 1913.

Application filed July 22, 1912. Serial No. 710,998.

*To all whom it may concern:*

Be it known that I, WILLIAM R. ALLEN, a citizen of the United States, residing at Goldengate, in the county of Wayne and State of Illinois, have invented certain new and useful Improvements in Land-Markers, of which the following is a specification, reference being had to the accompanying drawings.

The present invention relates to new and useful improvements in land markers, which are adapted to be applied to a corn planter, and the primary object of the present invention is to provide a mechanism by which the land marker may be raised or lowered from the driver's seat of the planter at will.

A further object of the present invention is to provide a device of this character to be simple in construction, strong, durable and efficient when in use, and be comparatively cheap in the cost of manufacture.

Other objects will be apparent hereinafter as the description continues.

With these and other objects in view, this invention consists of novel details of construction, combination, formation and arrangement of parts as will be hereinafter more fully described, claimed and particularly pointed out in the accompanying drawings, in which—

Figure 1 is a side elevation of a portion of a corn planter having one of the ground walls removed and illustrating my invention as applied thereto, and Fig. 2 is a rear elevation of the same having my invention as applied thereto shown in full lines in the raised position and in dotted lines in the lowered position.

Reference now being had to the accompanying drawings wherein I have illustrated corresponding parts by like numerals throughout the several views, for a better illustration of my invention, I have shown a portion of an ordinary corn planter comprising a frame A having mounted thereon the usual driver's seat B and having applied thereto an axle C, upon which is mounted the ground wheels D for supporting the frame in the usual and well known manner.

Secured to the rear end of the main frame A of the corn planter adjacent the middle portion thereof, I have pivotally mounted at 1, an arm 2 having rotatably mounted in its free extremity a disk 3 for marking the adjacent row in the usual manner.

Providing means for raising and lowering this marker, I have journaled upon the main frame A of the corn planter, an L-shaped lever comprising one arm 4 which extends transversely of the frame and is journaled within suitable bearings 5 which are permanently secured to the main frame of the corn planter and depending therefrom. A crank lever, indicated by the numeral 6, extends longitudinally of the main frame and is journaled within a pair of bearings 7, permanently mounted upon the said frame. One end of this lever 6 is connected to an extension 8 mounted upon the middle portion of the transverse arm 4 of the lever by means of a link 9, whereas the opposite end of this crank lever is slidably connected to the shaft 2 of the marker. The longer arm of the crank shaft 6 is bifurcated, as at 10, and each of the bifurcations is provided with concave rollers 11 which extend laterally from the lever. The shaft 2 of the marker is adapted to operate between the rollers 11 so that when the crank shaft is operated, the marker 3 will be raised and lowered as desired.

One arm of the lever, as indicated by the numeral 12, is provided with a handle by which the operator may raise and lower the marker. This handle of the lever extends upwardly adjacent the seat mounted upon the corn planter upon the right side of the frame thereof. A segmental rack 13 is permanently mounted upon the main frame A of the corn planter, and a spring actuated pawl 14 is mounted upon the lever arm 12 for engaging said rack so that when the marker is raised or lowered, it will be held in that position.

It will be seen from the foregoing description, taken with a corn planter provided with mechanism as before described for raising and lowering the marker which will hold the same at any desired angle or keep it in constant contact with the ground and also provides means for raising the marker when turning from one row to another.

Having thus described the invention, what is claimed is:—

1. In a land marking device of the character described, the combination of a corn planter frame, an arm pivotally mounted at one end upon the rear portion of the said frame, a marking element mounted on the opposite end of said arm, a crank lever mounted upon the said frame and extending longitudinally thereof, one arm of said crank lever being bifurcated, concave rollers mounted within said bifurcated portion and connected to the arm of the marker, an L-shaped lever, one arm thereof extending transversely of the said frame and journaled therein, an extension formed upon said last mentioned arm, a link connecting said extension with one arm of the crank lever, an operating arm extending from said L-shaped arm, a rack mounted upon the said frame, and a spring actuated pawl mounted upon the operating arm of the L-shaped lever for engagement with said rack, substantially as and for the purpose described.

2. In combination with a planter frame, of a marker comprising an arm pivotally secured at one end to the said frame, a marking device carried by the opposite end of said arm, a crank lever extending longitudinally of the frame and journaled thereupon, laterally disposed rollers extending from one end of said crank lever and partly encircling the medial portion of the said marker arm, and means for operating the opposite end of said crank lever whereby the said marker may be raised and lowered, substantially as described.

In testimony whereof I hereunto affix my signature in the presence of two witnesses.

WILLIAM R. ALLEN.

Witnesses:
  J. J. SCOTT,
  MARK KIMBRELL.

---

Copies of this patent may be obtained for five cents each, by addressing the "Commissioner of Patents, Washington, D. C."